United States Patent [19]

Carlson et al.

[11] 3,811,855

[45] May 21, 1974

[54] METHOD OF TREATING A GLASS BODY TO PROVIDE AN ION-DEPLETED REGION THEREIN

[75] Inventors: David Emil Carlson, Yardley, Pa.; Kenneth Warren Hang, East Windsor; George Fairbank Stockdale, Princeton, both of N.J.

[73] Assignee: RCA Corporation, New York, N.Y.

[22] Filed: Oct. 10, 1972

[21] Appl. No.: 295,974

[52] U.S. Cl............... 65/30, 204/130, 204/242, 250/531
[51] Int. Cl............................................ C03c 23/00
[58] Field of Search............ 250/531; 204/242, 130; 117/226; 65/30

[56] References Cited
UNITED STATES PATENTS

| | | | |
|---|---|---|---|
| 3,470,076 | 9/1969 | Klien et al. | 204/130 |
| 3,441,488 | 4/1969 | Onstoft | 204/130 |
| 3,400,054 | 9/1968 | Ruka et al. | 204/130 |
| 2,701,832 | 2/1955 | Marsden et al. | 117/226 |
| 3,174,919 | 3/1965 | Spremulli | 65/30 |

*Primary Examiner*—S. Leon Bashore
*Assistant Examiner*—Kenneth M. Schor
*Attorney, Agent, or Firm*—Glenn H. Bruestle; William S. Hill

[57] ABSTRACT

A method that modifies the composition of a region adjacent the surface of an ion conducting glass body comprises applying an electric field, at an elevated temperature, between opposite surfaces of the glass body to remove substantially all monovalent and most divalent ions from the region. A desired ion-depleted region occurs adjacent the anode-contacted surface of the glass body if the anode is a blocking electrode of relatively non-reactive material with the components of the glass body. A preferred blocking anode is a porous layer of colloidal particles of graphite. A particulate graphite anode allows oxygen evolving from the glass to escape therethrough, or combine with the evolving oxygen to produce easily removable gaseous byproducts, and does not supply cations to the glass body.

9 Claims, 5 Drawing Figures

PATENTED MAY 21 1974          3,811,855

METHOD OF TREATING A GLASS BODY TO PROVIDE AN ION-DEPLETED REGION THEREIN

BACKGROUND OF THE INVENTION

This invention relates to a method of treating a glass body to provide an ion-depleted region therein. The novel method is particularly useful for modifying the composition of a glass body, adjacent the surface thereof, to render it suitable for many special purposes.

When an electric field is applied to an ion-conducting glass at an elevated temperature, the electrical conduction characteristics of the glass are affected by the type of electrode material employed. If the anode is a non-blocking electrode and can supply cations to the glass, a field-assisted ion exchange occurs at the anode-contacted surface of the glass. However, if the anode is a blocking electrode, that is, one that does not furnish cations to the glass, then an ion-depleted region forms adjacent the surface of the glass. In an alkali-silicate glass, the ion-depleted region results from a displacement of alkali ions away from the anode-contacted surface and a removal of nonbridging oxygen ions (from components in glass other than from $SiO_2$) by the electric field. This process, called surface ion depletion, ideally creates a microporous region that is depleted of substantially all monovalent and most divalent ions. The microporous region consists essentially of silicon dioxide and/or other glass formers and intermediates, depending on the original glass composition.

It has been proposed to apply an electric field across a glass body to alter the properties of the glass body by electrolysis, but solid metallic electrodes have been used in these processes. When a glass article is maintained at an elevated temperature and an electrical potential is applied across the glass body with solid metal electrodes, alkali ions migrate toward the cathode and nonbridging oxygen ions migrate toward the anode, as, for example, described in U.S. Pat. No. 3,639,114 for "Method of Reshaping and Ion Exchanging Glass." Under these conditions, there is a tendency for some alkali ions to collect along the cathode-contacted surface of the glass body to stain it, and for other ions to form compounds that can attack the glass body at that surface. The results of such treatment are non-uniformity of composition and devitrification of the cathode-contacted surface of the glass. At the same time, oxygen evolved at the anode-contacted surface of the glass causes bubbles to form, resulting in a marring and possible crazing of that surface and also causing a possible separation of the solid anode electrode from the glass surface. Also, some solid metal anodes (i.e., Ag) may inject cations into the glass, especially at high temperatures (near temperature of deformation of glass).

It has been proposed to employ glass buffer plates between the electrodes and the glass body to be treated to remedy the aforementioned disadvantages, but the use of buffer plates is not practical for treating glass bodies whose shape (geometry) is other than flat, as, for example, in U.S. Pat. No. 3,174,919, for "Methods of Electrolyzing Glass." Also, the use of buffer plates is not practical for treating moderate to high alkali-containing glass bodies, such as Corning code 0800 glass, for example, because an ion-depleted region is produced adjacent the anode-contacted surface of a buffer plate and the bulk glass is not appreciably affected due to the high electrical resistance of the ion-depleted region in the buffer plate.

By the term "surface ion-depleted region", as used herein, is meant an ion-depleted region adjacent to a surface.

SUMMARY OF THE INVENTION

The novel method of treating a glass body to provide an ion-depleted region adjacent at least one of two opposite surfaces of the glass body comprises applying a separate electrode to each of the opposite surfaces of the glass body, heating the glass body, and applying a voltage between the electrodes, at least one of which is a blocking electrode.

By employing a blocking electrode, no cations are introduced into the glass body to cause an unwanted ion exchange therein. The preferred blocking electrode is also porous, such as a layer of colloidal particles, to allow oxygen that evolves from the glass body to escape through the electrode.

In a preferred embodiment of the novel method, the voltage is dc (direct current) and at least the anode electrode is a blocking electrode.

In another embodiment of the novel method, the voltage (applied across the glass body) is ac (alternating current) and both electrodes are blocking electrodes.

In still another embodiment of the novel method, the temperature of the glass body is lowered, from a temperature not to exceed the deformation temperature of the glass, during the application of the voltage, to prevent crazing of the glass body.

DESCRIPTION OF THE PREFERRED EMBODIMENTS

When a dc potential is applied to a typical ion-conducting glass body with a blocking anode electrode, a complex dissociation and displacement of ions occur. Initially, positive ions with the highest mobility are displaced inwardly from the anode-contacted surface. As these mobile ions are removed, the local electric field reaches a level sufficient to displace the positive ions with lower mobilities and the nonbridging oxygen ions. The nonbridging oxygen ions move to the anode electrode where they give up electrons and combine to form oxygen gas molecules. An irreversible compositional change occurs in the anode-contacted region of ion conducting glasses as a result of the displacement of the mobile positive ions and the removal of the nonbridging oxygen ions. The resulting surface ion-depleted region consists of a glass-former structure with a microporosity determined by the number and size of the ions removed from the ion-depleted region.

In glasses containing several types of mobile ions, only the most mobile ion species are completely displaced from the ion-depleted region. Other less mobile ions tend to pile-up beneath the ion-depleted region. This pile-up may induce a local compression which places the depleted region in tension and may cause the anode-contacted surface of the glass to craze. Since the depleted region of the glass has a lower expansion coefficient than the bulk glass, this surface crazing can usually be suppressed by cooling the glass during the ion-depletion process. Thus, compression introduced by the cooling tends to counteract the tension caused by the aforementioned pile-up.

Figure 1:
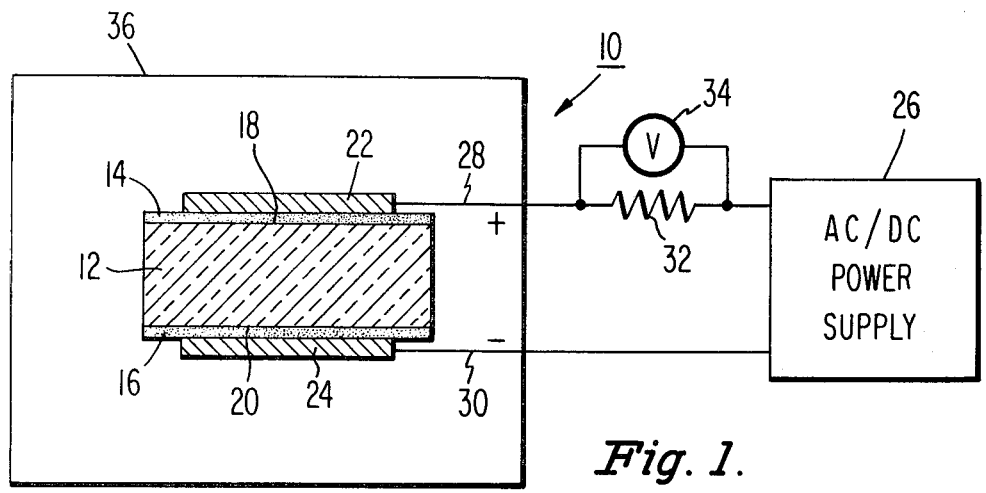
FIG. 1 is a schematic drawing of an apparatus for treating a glass body, shown in cross section, to provide a surface ion-depleted region therein.

Referring now to FIG. 1 of the drawing, there is shown an apparatus 10 for treating a glass body 12 to provide a surface ion-depleted region therein. A pair of electrodes 14 and 16 are applied to the opposite surfaces 18 and 20, respectively, of the glass body 12. Electrically conducting graphite-felt pads 22 and 24 are placed in contact with the electrodes 14 and 16, and connected to an ac/dc power supply 26 through leads 28 and 30, respectively. The power supply 26 is capable of producing either an ac or dc output, depending on its preset adjustment. The lead 28 is connected to the power supply 26 through a resistor 32 that is monitored by a meter 34 to measure the current output of the power supply 26. The glass body 12 is disposed within an oven 36 capable of providing controllable temperatures that are at least equal to the deformation temperature of the glass body 12.

When the power supply 26 is used as a dc power supply, the electrode 14 is an anode electrode and the electrode 16 is a cathode electrode, as indicated in FIG. 1. The anode electrode 14 must be composed of a non-reactive material with components of the glass body 12 so that it does not inject cations of any type into the glass body 12. Furthermore, the anode electrode 14 must be porous enough to allow (nonbridging) oxygen evolving from the glass body 12 to escape. A colloidal graphite coating, such as a porous layer of micron-sized particles of colloidal graphite, commercially available as "Aquadag" or "Aerodag G" (products of Acheson Colloids Co., Port Huron, Mich.) is an excellent, and preferred, anode material for use in the novel method for treating glass bodies to provide an ion-depleted region therein. By the term "colloidal particle" is meant a particle having an average diameter of about one micron or less, and forming a colloidal suspension in a liquid or aerosol medium. For ion depletions that are carried out above about 500°C, it is necessary to provide a nonoxidizing atmosphere, such as nitrogen, for example, to prevent a rapid oxidation of the colloidal graphite coating.

In practice, the anode electrode 14 is applied to the surface 18 by allowing a layer of a colloidal suspension of graphite particles in ammoniated water, such as "Aquadag," to dry. A layer of colloidal particles of graphite, such as "Aerodag G," can also be applied to the surface 18 from an aerosol spray of colloidal graphite in an aerosol medium. The layer of colloidal particles of graphite should be between about 1 and 5 mils in thickness. After application to the surface of the glass, the layer of colloidal particles is heated to evaporate the colloid suspension (i.e., water) media. The dried layer of colloidal graphite has a resistance of less than about 100 ohms per square, depending upon the thickness of the layer. These values of thickness and resistivity are merely illustrative and are not critical. Colloidal particles of platinum, rhodium, silicon, palladium, iridium, molybdenum disilicide ($MoSi_2$) and mixtures thereof may also be used in the same manner as the colloidal particles of graphite to provide a porous blocking anode electrode, but the colloidal graphite is preferred because of its relatively low cost, ease of handling, and availability.

The cathode electrode 16 is also a colloidal graphite coating similar to that of the anode electrode 14. However, for short treatment times, with a dc voltage, the cathode electrode 16 may be any high temperature conductive coating. For long treatment times with a dc voltage, the cathode electrode 16 may be a nonblocking electrode, such as a molten salt containing the conducting ion species of the glass. If a solid metal, such as platinum foil, for example, is used for an electrode for long treatment times, a brown stained region usually develops at the cathode-contacted surface 20. This brown stained region is a colloidal dispersion of metallic particles from the glass that results from a pile-up of conducting ions from the glass at the cathode-contacted surface 20. The neutralization of these ions is most likely due to the field emission of the electrons from the cathode electrode 16. The stained region can be removed by polishing or rinsing in a dilute hydrofluoric acid.

Figure 2:
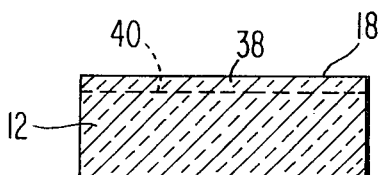
FIG. 2 is a cross-sectional view of the treated glass body indicating schematically one surface ion-depleted region.

The rate of ion depletion from the surface depends on the mobility and density of ions that can be displaced, and the magnitude of the applied voltage. The depletion rate for a specific glass body 12 can be optimized by operating at a temperature just below the temperature of deformation of the glass and by using as high an applied voltage as possible. The voltage is limited by the dielectric breakdown or thermal runaway effects that can melt the glass body 12 locally. For a fixed voltage and temperature, the surface ion depletion rate decreases continuously with time because of the increasing electrical resistance of the growing surface ion-depleted region. Referring to FIG. 2, a surface ion-depleted region 38, indicated schematically between the surface 18 and a dashed line 40, can have a depth of up to 200,000A.

Figure 3:
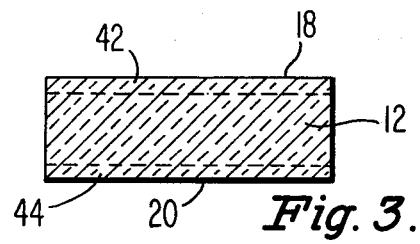
FIG. 3 is a cross-sectional view of the treated glass body indicating schematically two opposite surface ion-depleted regions.

The opposite surfaces 18 and 20 of the heated glass body 12 can be depleted simultaneously by applying a low frequency (1.0 – 0.001 Hz), high voltage, ac signal between the electrodes 14 and 16. Both of the electrodes 14 and 16 should comprise porous blocking electrodes, such as a porous layer of colloidal graphite, as described supra, when an ac voltage is used. Under these conditions, the power supply 26 is used as an ac power supply capable of providing a voltage of between 1 and 3,000 volts ac at a frequency of between 1.0 and 0.001 Hz. The power supply is also capable of delivering several watts of power per $cm^2$ of treated surface of the glass body 12. The glass body 12 is heated to a temperature not to exceed its temperature of deformation. Separate permanent surface ion-depleted regions 42 and 44 (FIG. 3), up to 200,000A in depth, form adjacent the opposite surfaces 12 and 16, respectively, because nonbridging oxygen ions are removed from the glass body 12 during the positive half of each ac cycle, making the depletion process irreversible. Most of the mobile positive ions from the ion-depleted regions 42 and 44 accumulate at the electrodes 12 and 14.

Examples of the Novel Surface Ion Depletion Process are as Follows:

EXAMPLE I

Glass: A sample of a television tube faceplate (alkali-strontium-silicate glass) of the following composition by wt.%: 63.2% $SiO_2$; 10.7% SrO; 9.9% $K_2O$; 7.5% $Na_2O$; 3.5% $Al_2O_3$; 1.6% CaO; and 1.2% MgO.

| Treatment: Time (min.) | Voltage | Temperature |
|---|---|---|
| 0 | 100V on | 450°C |
| 10 | increased to 425V | 360°C |
| 40 | 425V off | 250°C |

The temperature was decreased continuously from the time the initial voltage was applied.

Electrodes: The anode and cathode electrodes were both layers of porous colloidal graphite.

Figure 4:
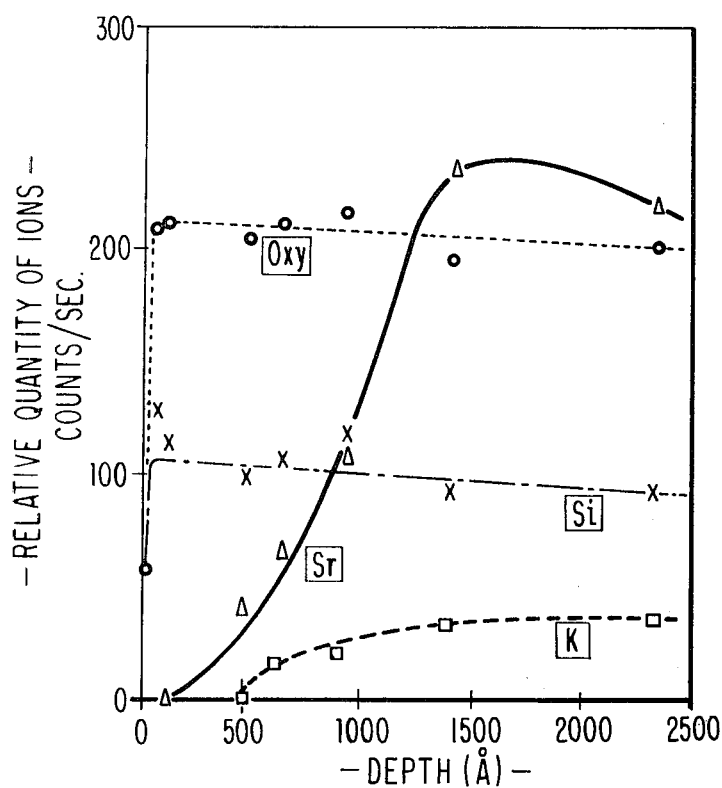
FIG. 4 is a graph showing the relative quantities of different ions, in a treated glass body, at different depths from a surface of the glass body.

FIG. 4 shows a compositional profile analysis of the alkali-strontium silicate glass treated under the conditions of EXAMPLE I. The data for the graph of FIG. 4 was obtained with an ion-scattering spectrometer of the type described and discussed in an article, "Surface Composition Analysis By Binary Scattering of Noble Gas Ions," published in the "Journal of Vacuum Science and Technology," Vol. 7, No. 1, pages 72–75 (1970).

The graph of FIG. 4 shows that the divalent strontium (Sr) ions have been completely removed from the first 200A from the anode surface. A strontium ion pile-up is also evident under the depleted region with a maximum of about 1,500A. A trace of potassium (K) ions appears at 400A, and the concentration gradually increases until it reaches 25 percent of the normal glass value at 2,400A. The sodium (Na) ions were completely removed from the investigated region, the average sodium depletion depth for this sample being calculated to be between 2 and 3 microns. The only constituents detected in the first 200A are the silicon and oxygen of the microporous silica layer. An electron microscope examination of this layer by replica technique indicated that the pore size is less than 20A. It is likely that the surface ion-depleted region consists mainly of a silica structure with interstitial cavities of dimensions comparable to those of the displaced ions.

Figure 5:
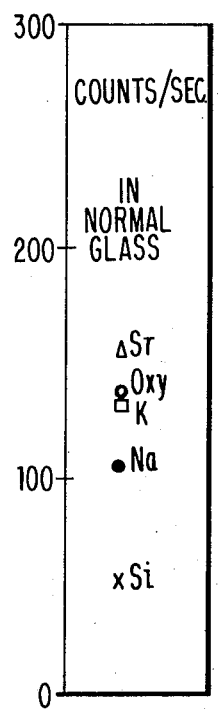
FIG. 5 is a graphical representation of the quantities of the different ions in an untreated glass body of the type represented in FIG. 4.

FIG. 5 is a representation of the relative quantities of different ions in the glass of EXAMPLE I before the surface ion depletion by the novel method.

EXAMPLE II

Glass: Corning code 7720 glass of the following wt.%: 73% $SiO_2$; 15% $B_2O_3$; 6% PbO; 4% $Na_2O$; and 2% $Al_2O_3$.

| Treatment: | Time | Voltage | Temperature |
|---|---|---|---|
| | 0 | 100V | 450°C |
| | 3 min. | 400V | 450°C |
| | 17 hrs. | 1000V | 450°C |
| | 17 hrs. 8 min. | 2000V | 450°C |
| | 18 hrs. 8 min. | 2800V | 450°C |

TABLE -Continued

| Treatment: | Time | Voltage | Temperature |
|---|---|---|---|
| | 22 hrs. | 2800V off | 450°C |

Electrodes: Both anode and cathode electrodes were layers of porous colloidal graphite. An examination by an electron microprobe analysis revealed that the Pb ion concentration had been decreased in the depleted region. An optical examination of a cross section of the treated glass showed local stresses over the depth of the ion-depleted region (about 200,000A).

EXAMPLE III

Glass: Composition by wt.%: 35% $Na_2O$ and 65% $SiO_2$.

| Treatment: | Time | Voltage | Temperature |
|---|---|---|---|
| | 6 min. | 20V | 400°C |
| | 14 min. | 40V | 400°C |

Electrodes: Both anode and cathode electrodes were layers of colloidal graphite. The anode-contacted surface of the glass was essentially insoluble in water; an untreated glass sample of this composition was relatively soluble in water in comparison to the treated glass.

EXAMPLE IV

Glass: A sample of a television tube faceplate of the following composition by wt.%: 63.2% $SiO_2$; 10.7% SrO; 9.9% $K_2O$; 7.5% $Na_2O$; 3.5% $Al_2O_3$; 1.6% CaO; and 1.2% MgO.

| Treatment: | Time | Frequency | Voltage Amplitude |
|---|---|---|---|
| | 0 | 1/4 Hz | 50V |
| | 3 min. | do. | 150V |
| | 8 min. | do. | 425V |
| | 10 min. | 1/7 Hz | do. |
| | 12 min. | 1/15 Hz | do. |
| | 29 min. | 1/35 Hz | do. |
| | 38 min. | do. | 425V off |

The voltages were square waves applied at a temperature of 450°C.

Electrodes: Both electrodes were layers of colloidal graphite. After treatment, the glass exhibited a faint blue reflective layer on each of its opposite surfaces.

EXAMPLE V

Glass: Composition by approximate wt.%: 73% $SiO_2$; 13% $Na_2O$; 6% CaO; and 4% MgO.

| Treatment: | Time | Voltage | Temperature |
|---|---|---|---|
| | 4 min. | +50 | 420°C |
| | 2 min. | −50 | 420°C |

Electrodes: Both electrodes were layers of colloidal graphite. Opposite surfaces of the treated glass were found to be dealkalized.

The data in the above examples are merely illustrative and the particular values of time, voltage, temperature, and rate of cooling can vary with the particular type of glass to be treated. The temperature range is usually between 150° and 600°C and should not exceed the temperature of deformation of the glass treated. The range of voltages used in the novel method is between 1 and 3,000 volts, but is always less than that which would cause a dielectric breakdown or thermal runaway. The time of treating the glass by the novel method will depend upon the depth of the surface ion-depleted region desired. Since the electrical resistance of a surface ion-depleted region increases with the depth of the region, surface ion-depleted depths of greater than about 200,000A become impractical.

The novel method of treating glass bodies to produce surface ion-depleted regions provides glass bodies that have many useful properties, depending upon the original glass composition and the specific treatment parameters used.

We have found the following properties in glass treated by the novel surface ion-depletion process:

1. With respect to chemical durability:
   a. After 5 days at 100°C, distilled $H_2O$ absorbed 88 times more Na from a control test tube of 0080 glass than from a tube with a treated interior.
   b. The ion-depleted surface of a piece of cathode-ray tube faceplate glass was not affected by molten $LiNO_3$ at 300°C whereas untreated glass turned white and cracked.
   c. A 5% HF solution attacked the ion-depleted surface of treated glass much more rapidly than untreated glass.
   d. The ion-depleted surface of a litha borosilicate glass was not affected by heating to 600°C whereas the untreated surface was devitrified.

2. With respect to resistance to electron browning:

The depleted surface provided good resistance to browning caused by electron bombardment. This has been shown in a pyrex glass (7720) and in a high alkali, lead borosilicate glass. The removal of alkali ions and the partial removal of Pb ions prevented colloidal particles of these elements from occurring when the surface was bombarded by electrons.

3. With respect to strengthening:

Moderate strengthening (about 30 percent) has been achieved to date (with 7720 and 7740 glasses). This strengthening is not appreciably affected by subsequent heat treatment (to 600°C). This is due to the chemical stability of the surface ion-depleted region.

4. With respect to nonreflective films:

The depleted layer has a different index of refraction from the normal glass and a nonreflective film can be formed by depleting to the proper depth. Since the depleted layer is porous $SiO_2$, the nonreflective film is not affected by heat cycling and is physically durable.

What is claimed is:

1. A method of treating a glass body where the glass structure includes mobile alkali metal ions, to provide an ion-depleted region adjacent at least one of two opposite surfaces of the glass, said method comprising the steps of:

applying a separate solid electrode to each of said opposite surfaces, the electrode adjacent said one surface being an electrode which is blocking toward introduction of said mobile metal ions from said electrode into the glass and comprises a layer of conducting colloidal particles, heating said glass to a temperature not exceeding the temperature of deformation of said glass, and applying a voltage between said electrodes to cause said mobile metal ions to migrate away from said one surface.

2. A method of treating a glass body as described in claim 1, wherein said blocking electrode comprises a layer of colloidal particles of graphite, each of said particles having an average diameter of about one micron or less.

3. A method of treating a glass body as described in claim 1, wherein;

said temperature is between 150 and 600°C, and said voltage is between 1 and 3,000 volts dc.

4. A method of treating a glass body described in claim 1, wherein:

said temperature is between 150° and 600°C, and said voltage is between 1 and 3,000 volts ac at a frequency of between 1.0 and 0.001 Hz.

5. A method of treating a glass body as described in claim 1, wherein;

said ion-depleted region has a depth of up to 200,000A, the step of applying said blocking electrode comprises applying colloidal graphite from a liquid suspension thereof to said one surface and evaporating the liquid to leave a layer of colloidal graphite on said one surface, and the step of applying a voltage between said electrodes comprises connecting said electrodes to a source of dc voltage.

6. A method of treating a glass body as described in claim 1, wherein:

said ion-depleted region has a depth of up to 200,000A, the step of applying each of said electrodes comprises providing a porous layer of graphite on each of said opposite surfaces by the evaporation of colloidal graphite from a liquid suspension thereof, and the step of applying a voltage between said electrodes comprises connecting said electrodes to a source of ac voltage.

7. A method of treating a glass body as described in claim 6, wherein:

said source of ac voltage provides an output with a frequency of between 1.0 and 0.001 Hz.

8. A method of treating a glass body as described in claim 1, wherein:

said blocking electrode comprises a porous layer of colloidal particles chosen from the group consisting of graphite, platinum, rhodium, silicon, palladium, iridium, molybdenum disilicide, and mixtures thereof.

9. A method of treating a glass body as described in claim 8, wherein:

said porous layer has a thickness of between about 1 and 5 mils and a resistance of less than about 100 ohms per square.

* * * * *